United States Patent
Gauthier et al.

(10) Patent No.: US 7,639,155 B2
(45) Date of Patent: Dec. 29, 2009

(54) METHOD FOR TRANSMITTER AND RECEIVER MATCHING

(75) Inventors: Laurent Gauthier, Toulouse (FR); Lionel Symoen, La Roche sur Foron (FR); Michel Fournet, Cuvat (FR); Eric Cheron, Tanninges (FR); Serge Neuman, Seynod (FR)

(73) Assignee: SIMU, Gray (FR)

( * ) Notice: Subject to any disclaimer, the term of this patent is extended or adjusted under 35 U.S.C. 154(b) by 211 days.

(21) Appl. No.: 10/482,500

(22) PCT Filed: Jun. 25, 2002

(86) PCT No.: PCT/FR02/02194
§ 371 (c)(1),
(2), (4) Date: Jun. 21, 2004

(87) PCT Pub. No.: WO03/007265
PCT Pub. Date: Jan. 23, 2003

(65) Prior Publication Data
US 2004/0240395 A1    Dec. 2, 2004

(30) Foreign Application Priority Data
Jul. 13, 2001    (FR) .................................. 01 09369

(51) Int. Cl.
*G05B 19/02* (2006.01)
*H04Q 5/22* (2006.01)
*G05B 19/00* (2006.01)

(52) U.S. Cl. ............................ 340/825.22; 340/825.23; 340/10.32; 340/5.65; 340/825.36

(58) Field of Classification Search ............ 340/825.22, 340/825.23, 10.32, 5.65, 5.6, 825.36; 370/254; 455/67.11
See application file for complete search history.

(56) References Cited

U.S. PATENT DOCUMENTS

| | | | |
|---|---|---|---|
| 4,750,118 A | 6/1988 | Heitschel et al. | |
| 5,218,646 A | 6/1993 | Sirat et al. | |
| 5,530,896 A * | 6/1996 | Gilbert | 340/825.52 |

(Continued)

FOREIGN PATENT DOCUMENTS

EP        0 867 848 B1    9/1998

(Continued)

*Primary Examiner*—Brian A Zimmerman
*Assistant Examiner*—Nam V Nguyen
(74) *Attorney, Agent, or Firm*—Husch Blackwell Sanders Welsh & Katz

(57) ABSTRACT

A transmitter is adapted to transmit a command, toward one or more receivers. Each receiver is adapted to receive said command and identify said transmitter, which as transmitted it. Furthermore, each receiver is adapted to supply a signal addressed to an installer, for example, a visual signal, by actuating an operator connected to the receiver. The method for matching a transmitter and a receiver includes assigning a subset or a rank to each receiver; then the receivers supply a signal, depending on their subset or their rank, for example, in response to a rank modifying command. When only the receiver to be matched supplies a signal, the installer emits a command from the transmitter. The receiver, which has just supplied the signal, receives the command and is matched to the transmitter, which has transmitted it. the matching is carried out without any action on the receivers, simply by means of commands transmitted from the transmitter.

27 Claims, 3 Drawing Sheets

U.S. PATENT DOCUMENTS

| | | | |
|---|---|---|---|
| 5,539,390 A * | 7/1996 | Nagano et al. | 340/825.52 |
| 5,541,670 A * | 7/1996 | Hanai | 340/825.24 |
| 5,767,784 A | 6/1998 | Khamharn | |
| 5,805,926 A * | 9/1998 | Le Van Suu | 710/16 |
| 5,848,054 A * | 12/1998 | Mosebrook et al. | 340/3.7 |
| 5,945,936 A | 8/1999 | Issa | |
| 6,125,365 A * | 9/2000 | Nakatsugawa | 340/825.2 |
| 6,538,563 B1 * | 3/2003 | Heng | 340/10.32 |
| 6,774,766 B1 * | 8/2004 | Moyer | 340/10.32 |
| 6,791,467 B1 * | 9/2004 | Ben-Ze'ev | 340/825.22 |
| 6,970,067 B1 * | 11/2005 | Sinke et al. | 340/5.65 |

FOREIGN PATENT DOCUMENTS

| | | |
|---|---|---|
| FR | 2 772 171 A1 | 6/1999 |
| FR | 2 792 443 A1 | 10/2000 |
| JP | 02-171040 | 7/1990 |
| JP | 07-200544 | 8/1995 |
| JP | 11-103308 | 4/1999 |
| WO | WO 01/71685 A1 | 9/2001 |
| WO | WO 01/71865 A1 | 9/2001 |

* cited by examiner

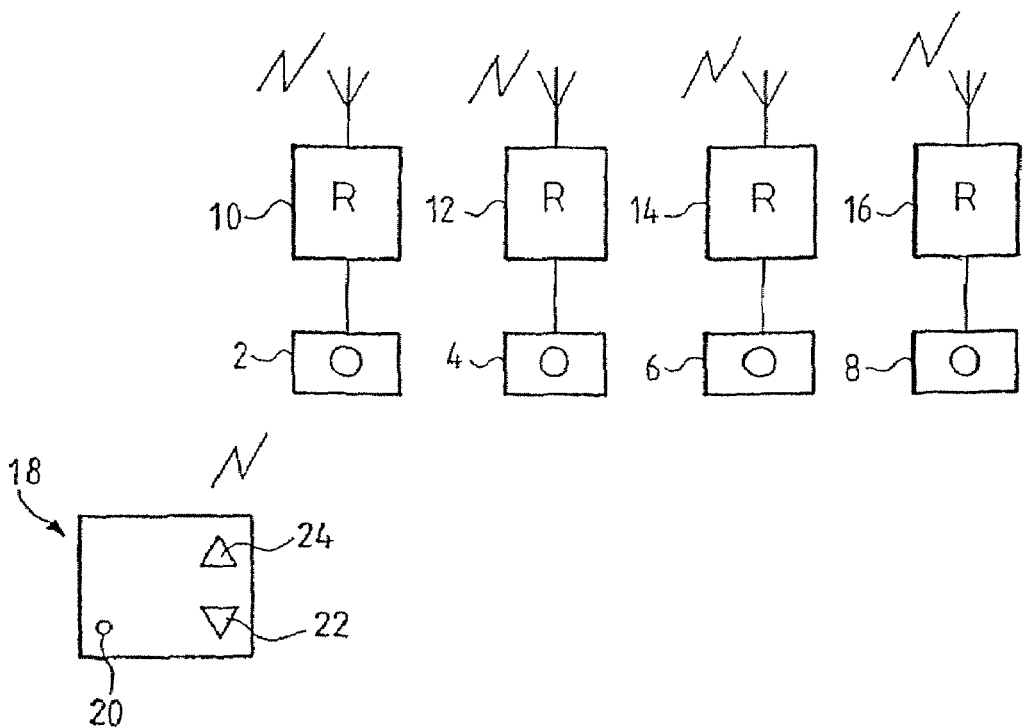
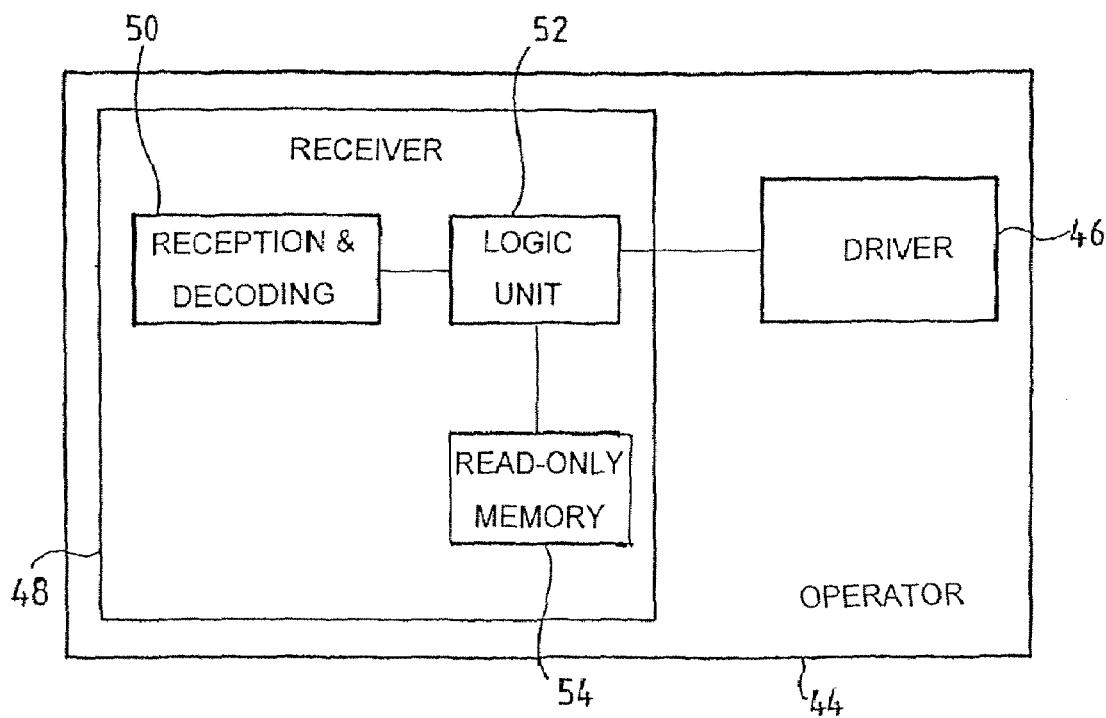

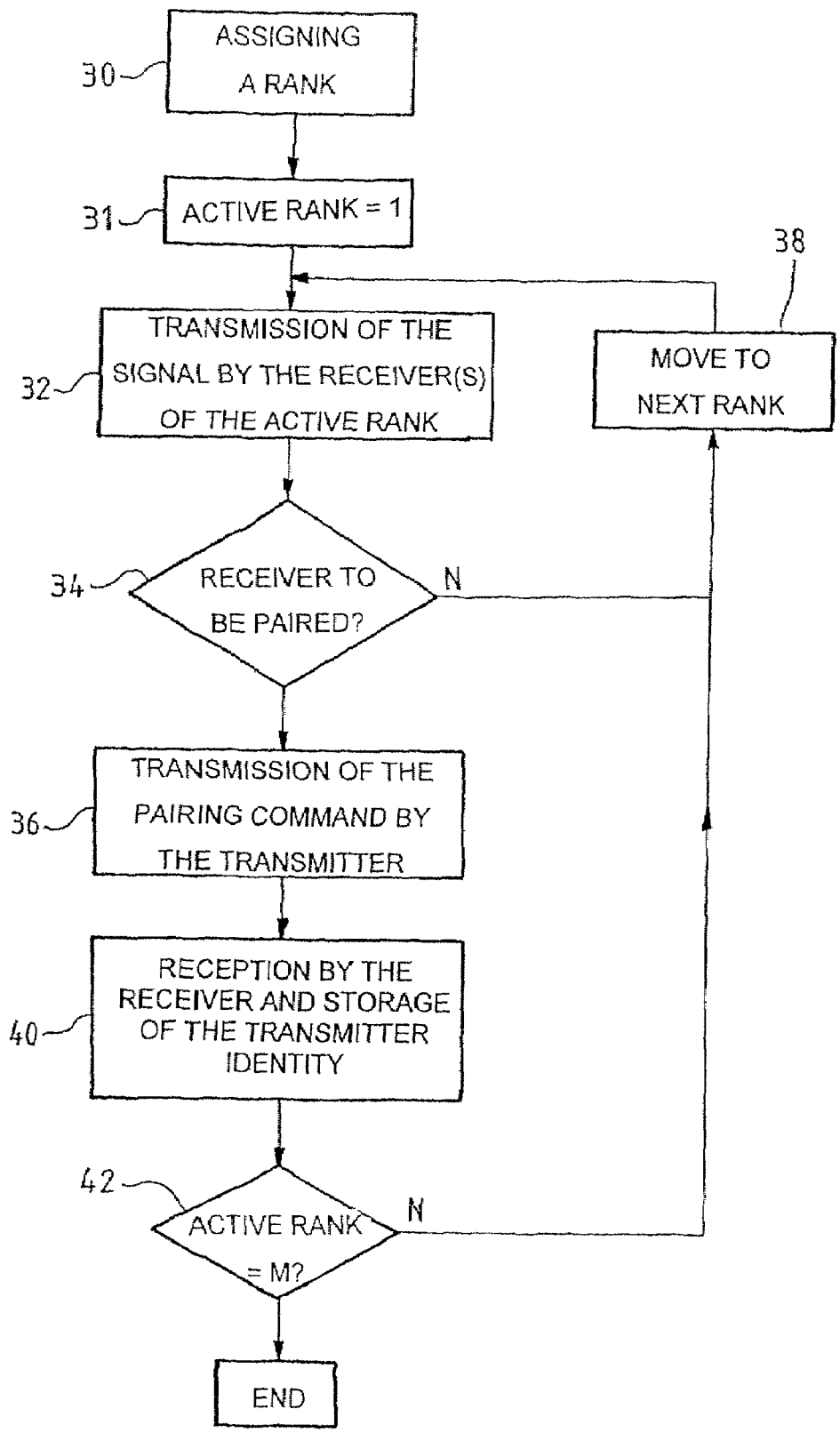

METHOD FOR TRANSMITTER AND RECEIVER MATCHING

FIELD OF THE INVENTION

The invention relates to the field of transmitters and receivers, and in particular transmitters and receivers of home automation systems.

BACKGROUND OF THE INVENTION

Such systems are used for motorized products or automatic devices for closing or for protection against sunshine in buildings or for the control of lighting or other units. Typically, one or more transmitters are provided; each device to be controlled—rolling shutter, blind, lighting unit, etc.—is associated with a receiver. The radio transmitters and receivers use the same transmission frequency. For these devices, and in particular for motorized products or automatic devices for closing or for protection against sunshine in buildings, logistic reasons most often necessitate that the pairing is not performed during manufacture, but rather on-site, after installation of the products.

In general, the radio receiver is capable of learning at least one address—or code or identity number—which identifies a transmitter, when it is set to a special learning mode. Such a functioning is described in U.S. Pat. No. 4,750,118 (Heitschel 1985). When the receiver is accessible, it is for example easy to use a specific button, or a special procedure on a button normally assigned to another use, in order to set the receiver to learning mode. A message is then transmitted from the transmitter to be paired, before the elapsing of a predetermined period, or before resetting the receiver to normal operating mode. In learning mode, the receiver therefore knows that it must store the address code contained in the received signal frame. The transmitter used for sending this signal thus becomes stored in memory by the receiver in the form of an identity number. Such a method is used by the applicant in its products sold under the name "Centralis Uno RTS".

Rather than acting on a specific programming control, the ability to transmit the command to set to learning mode directly from the transmitter itself was considered. In this case, each of the transmitters has a different identity number, but contains a same code, recognized by any receiver, for putting the receivers into programming mode. The reception by a receiver of the setting to learning mode code and of the identity number of a transmitter makes it possible to pair that transmitter with the receiver. The installer does not therefore need to handle the receiver in order to set it to learning mode simply by using, for example, a specific button on the transmitter which then transmits both the setting to learning mode code and its identity number. This solution is used in the product sold by the applicant under the name "Telis". This solution can present a problem when several receivers are within the range of the transmitter. In this case, all of them will learn the identity of a transmitter assumed to control just one of them.

Several solutions have already been proposed to solve this designation problem, both for the case of an initial pairing and also for the cases of commands for groups of equipment or of replacement of a transmitter by another one in the event of loss, etc. Two such examples can be found in FR-A-2 772 171 (Gauthier 1998) and FR-A-2 792 443 (Symoen 1999).

It should be noted that once the initial pairing is complete for the whole installation, known techniques make it possible to subsequently set just one of the receivers to learning mode in order for it to learn the identity of a second transmitter of or a plurality of other transmitters also capable of controlling it. An example of such a technique is given in EP-A-0 867 848.

Finally, the development of specialized circuits of the radio transceiver type and supporting a network-type protocol made it possible to have a solution in which the installer is provided with a programming console. Each of the preceding receivers is therefore also a transmitter, and the programming console is therefore not only a transmitter but also a receiver. In the learning phase, the receivers send their own unique identification number to the console. The software contained in the console makes it possible to sequence the receivers that have presented themselves. The installer then has the possibility of sending, successively, a command that will be recognized only by the single receiver concerned and of proceeding with the pairing of that receiver, which is thus identified physically by responding to the said command, with the transmitter designated to control it subsequently.

However, even though simple to use, this system requires a specific programming tool, which is a heavy constraint for small installations.

WO-A-01 71865, claiming an earlier priority to the present application but published later than it, describes an assembly of different apparatuses capable of communicating with a remote control unit over bidirectional links. Each of the apparatuses is assigned with a unique apparatus code, which is allocated by the wireless transmission protocol. This document gives no further details on the assigning of the unique number.

SUMMARY OF THE INVENTION

There is therefore a need for a simple, fast and reliable method for pairing a transmitter with a receiver. This method should also function when the receiver is one receiver among a plurality of receivers; ideally, this method does not require intervention on the receiver.

In one embodiment, the invention provides a method for pairing a transmitter and one out of at least two receivers, the transmitter being adapted for transmitting a command, each receiver being adapted to receive this command and to identify the transmitter and to supply a signal intended for an installer, the method comprising:

(a) a step of definition of a subset from among the set of receivers;

(b) a step of supplying the signal by each receiver of the subset;

(c) if only the receiver to be paired has supplied the signal, a step of transmission of a command by the transmitter and of pairing the receiver having supplied the signal with the transmitter which transmitted the command and, if not, a step of definition of a new subset, the step of definition of a new subset being followed by an iteration of steps (b) and (c).

Advantageously, the step of definition of a new subset comprises the definition of a new subset of cardinality less than (i.e. having fewer elements than) the preceding one. It is also possible to provide for the step of definition of a new subset to comprise the definition of a new subset included in the preceding subset if the receiver to be paired has supplied the signal and the definition of a new subset disjoint from (i.e. having no element in common with) the preceding subset if the receiver to be paired has not supplied the signal.

In one embodiment, the receivers are represented by the leaves of a tree structure. It is then advantageous that the steps are carried out according to a dichotomic traversal of the tree structure.

In another embodiment, the invention provides a method for pairing a transmitter and one out of at least two receivers, the transmitter being adapted for transmitting a command, each receiver being adapted to receive this command and to identify the transmitter and to supply a signal intended for an installer, the method comprising:

(a) a step of assigning of a rank to each receiver;

(b) a step of supplying the signal by each receiver of a given rank; and (c) if the receiver to be paired has supplied the signal, a step of transmission of a command by the transmitter and of pairing of the receiver which supplied the signal and of the transmitter which sent the command, and otherwise, a step of changing of rank, (d) the step of changing of rank being followed by an iteration of steps (b) and (c).

Advantageously, the assigning step comprises, for each receiver, the choice of an order number independently of the other receivers. In one embodiment, the choice is random.

Advantageously, the assigning step comprises the assigning of a separate number to each receiver. In one embodiment, the separate numbers are consecutive.

In one embodiment, the step of changing of rank comprises the transmission by the transmitter of a change of rank command.

In another embodiment the transmitter comprises a unique identification number sent in a command and the pairing step comprises the storage by the receiver of the number contained in the command.

The invention also relates to a method for pairing for a receiver adapted to receive a command send by a transmitter and to identify the transmitter and to supply a signal intended for an installer, the method comprising:

(a) a step of assigning of a rank;

(b) a step of supplying the signal as a function of this rank; and (c) on receipt of a command following the supplying step, a step of pairing with the transmitter which sent the command.

Advantageously, the assigning step comprises the choice of an order number.

In one embodiment, the choice is random.

Advantageously, the receiver can communicate with other receivers, and the assigning step comprises a communication to other receivers and the possible receiving of the responses of the other transmitters.

Typically, the step of supplying the signal comprises the receiving of at least one change of rank command and the supplying of the signal as a function of the number of change of rank commands received.

In one embodiment, the command sent by a transmitter comprises a unique identification number and the pairing step comprises the storage of the number contained in the command.

The invention also relates to a receiver presenting:

a circuit for receiving and for decoding commands sent by a transmitter;

means for supplying a signal intended for an installer; and a program executing the above method.

Advantageously, the receiver comprises a storage memory.

Typically, the circuit is also adapted for transmitting.

Other features and advantages of the invention will appear on reading the following description, given by way of example and with reference to the drawings.

BRIEF DESCRIPTION OF THE DRAWINGS

FIG. 1 is a block diagram of an installation according to a first embodiment of the invention;

FIG. 2 is a flowchart of a first embodiment of a method according to the invention;

FIG. 4 is a block diagram of a receiver according to one embodiment of the invention.

DETAILED DESCRIPTION

Figure 3:
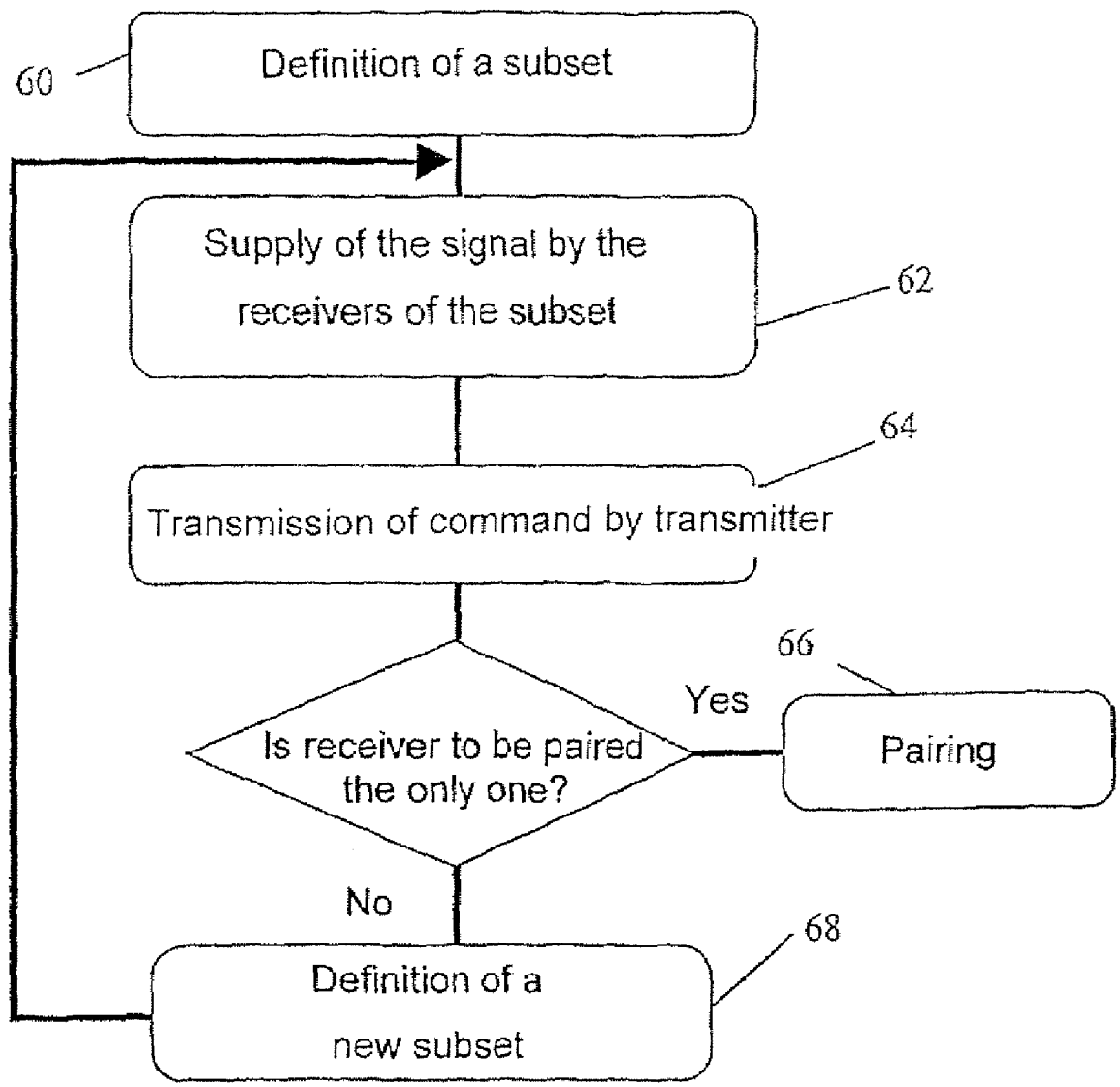
FIG. 3 is a flowchart of another embodiment of a method according to the invention.

In this written description, the use of the disjunctive is intended to include the conjunctive. The use of definite or indefinite articles is not intended to indicate cardinality. In particular, a reference to "the" object or thing or "an" object or "a" thing is intended to also describe a plurality of such objects or things.

Firstly, with reference to FIGS. 1 and 2, there will be described an example embodiment of the invention in which the receivers are not connected to each other. There will then be described another example in which the receivers are capable of communication with each other.

FIG. 1 shows an installation in a first example embodiment of the invention. The installation comprises a plurality of controllers 2, 4, 6 and 8, referenced by the letter "O" in the Figure. The operating units can, for example, roll or unroll blinds or rolling shutters, actuate a lighting unit, open a door, switch an alarm on or off, etc. Each operating unit is connected with a receiver 10, 12, 14, or 16, referenced "R" in the Figure. Each receiver has an antenna which allows it to receive commands transmitted from a transmitter by radio link. The radio transmission of commands from a transmitter to one or more receivers is known per se and is not described in greater detail here. FIG. 1 also shows a transmitter. This transmitter is adapted to transmit commands by radio link to the receivers 10, 12, 14 or 16. Advantageously, it has a unique identification number which is transmitted at the same time as a command and which allows the receiver to recognize the source of the command.

The transmitter is adapted to send at least two different commands to the receivers. The simplest system consists in providing at least two buttons, one press on a button causing the transmission of a command. In the example of FIG. 1, three buttons 20, 22 and 24 are provided: button 20 causes the transmission of a programming command; button 22 causes the transmission of a command to lower the blind or shutter rolled on the operating unit; button 24 causes the transmission of a command to raise the blind or shutter. As explained above, in an installation of the type shown in FIG. 1, a problem which arises is that of the pairing of transmitters and receivers. In other words, the problem is that of associating one of the receivers with a transmitter, such that the commands transmitted by the transmitter are executed by the receiver. As mentioned above, there are known solutions for then associating a second transmitter with a receiver.

The invention proposes carrying out this association by "zapping". For this purpose, the receivers or the associated operating units successively transmit a signal for the attention of the user. The user can, as a function of the signal, cause the transmission of a command by the transmitter and thus pair the transmitter with the receiver.

The signal transmitted by the receivers or the operating units can be any signal, insofar as it is perceived by the user. It is possible for example for the operating unit to move alternately in one direction and in the other, over a short distance, as mentioned in the patents FR-A-2 728 or FR-A-2 728 700. It is also possible, if the zapping is caused by pressing a key, that the signal is, for the receiver concerned, simply the operation corresponding to the touch key used: if it is the "lower" key, the receiver lowers as long as this key is pressed.

The signal can be a sound signal if the receiver or the associated operating unit is provided with a sound source. The signal can be a light signal—for example the flashing of a diode, if the receiver or the associated operating unit is provided with a light source. Hereafter, by way of example, the case is considered in which the signal is a visual signal of movement of the blind or shutter driven by the operating unit in alternative directions.

FIG. 2 shows a flowchart of a method for pairing in an installation of the type shown in FIG. 1. In a first step 30, each of the different receivers or operating units determines a rank or order number for sending a signal. In the flowchart of FIG. 2, the different receivers determine this order number independently of each other. This step can be carried out in various ways. It concerns only receivers that are not yet paired.

This step can begin when the transmitter is activated, or spontaneously. In the first case, the transmitter is actuated by the installer in order to transmit a start pairing command. A specific button can be supplied for this purpose. It is simpler to use a sequence of pressings on the buttons of the transmitter in order to cause the transmission of the start pairing command. This solution avoids having to provide the transmitter with as many buttons, as there are functions and can be implemented simply by an appropriate programming of the transmitter. All other possible solutions can also be used, for example by action on the electrical power supply of the operating units and receivers. In the example of FIG. 1, the start of pairing can be indicated by a succession of pressings on the keys 22 and 24, according to a given sequence.

In the simplest example, the receivers or operating units randomly choose a number from a list. It is possible for example to choose a number randomly from among M possible numbers; a possible value of M is 10; this value is preferably greater than the number of receivers or operating units, so that good pairing efficiency is assured. The duration of the pairing process increases according to the value of M; the choice of this value is a compromise between the efficiency and the duration of the pairing process. A value of M of 10 is appropriate, in particular for installations of blinds or rolling shutters.

This solution is the simplest; it does not necessarily prevent two receivers or operating units from choosing the same number. In order to reduce such a possibility of collision, it is possible the limit the possible choices of a receiver or of an operating unit, or even to make a purely deterministic choice. One solution is to use a number that is specific to the receiver for a calculation, for example, it would be possible to impose that a receiver whose specific number is even or odd, respectively, must choose a number that is even or odd, respectively, from the list. An order number could also be calculated from the specific number of the receiver, for example for the calculation of the specific number of the receiver modulo the number of ranks in the list. This latter, purely deterministic solution is not per se of such a nature that all risk of collision is eliminated with certainty. It can however reduce the possibility of a collision—for example if it is assumed that the specific numbers of the receivers of a new installation have chances of being consecutive numbers.

After step 30, in a random, partially deterministic or perfectly deterministic manner, the receivers or the operating units are assigned a serial or rank number in a list common to all the receivers.

Each receiver contains, in a memory, an internal counter indicating the active rank in the process that will follow.

In an initialisation step 31, the active rank becomes the first number of the list.

In step 32, the receiver or the receivers or operating units having a rank equal to the active rank transmit a signal. In step 34, the installer determines if the receiver or the operating unit that transmitted a signal is the one which must be paired with the transmitter. If such is the case, the process proceeds to step 36. Otherwise the process proceeds to step 38.

In step 36, the installer has determined that the receiver or the operating unit that transmitted the signal is the one that must be paired with the transmitter. The installer transmits a pairing command using the transmitter. In the example of FIG. 1, this command can be transmitted by pressing the programming button 20. The program proceeds to step 40.

In step 40, the receivers or operating units receive the pairing command transmitted in step 36. That one of the receivers or operating units that has just transmitted a signal in step 32 then considers that it is paired with the transmitter: it stores the number of the transmitter that has just transmitted the pairing command, such as read in the command. The pairing is therefore completed for the transmitter in question; it can of course be repeated for other transmitters that should be paired with that same receiver.

After this pairing operation, the process moves to step 42, in which the active rank is tested in order to know if the whole of the list has been gone through, in which case the process is terminated, at least for the set of transmitters that have been able to be paired. If this is not the case, the process proceeds to step 38 for iteration.

In step 38 the process moves to the next rank. As mentioned above, it can be a spontaneous move, for example after a time delay; it can also be a move initiated by the transmitter. In this latter case, the move to the next active rank is commanded by the installer pressing one or more of the keys of the transmitter. It is possible for example, during the zapping phase, to give another significance to the functions keys normally assigned to the raising and lowering commands: one of them then serving for moving from one active rank to another by incremention, the other serving to move from one rank to another by decremention. On receiving these signals, the receivers determine at all times the common value of the active rank.

It is also possible to decide that a receiver whose order number corresponds to a given active rank should react normally to the commands that it receives by pressing and holding down the lowering and raising remote control keys. The move from one rank to another can then take place during two consecutive pressings on a same key. Incrementing or decrementing of ranks can also be provided.

It is understood that the flowchart of FIG. 2 is followed, in the worst of cases, until all possible ranks have been scanned; at that time, every receiver to be paired has necessarily reacted and transmitted a signal.

It is still possible that two receivers or operating units have the same rank and react together. In this case, the installer will have to restart the entire process, but only the receivers not yet paired will be involved.

The receivers can be programmed to observe that no pairing command has been transmitted following their transmission of a signal. It is then possible, for these receivers, to change the assigning of order numbers, whether this be a deterministic or a partially deterministic assignment. This change of assigning mode will be activated in step 30 of the following process. This prevents the same two receivers from reacting together again during the next process.

In practice, it will be understood that the installer can start the process of FIG. 2, pair the first receiver with a transmitter, and then continue the process in order to pair another receiver with another transmitter. The installer can also carry out a pairing as soon as he observes that his transmitter acts on one and only one receiver, not mattering much whether or not it is the one in front of him. This speeds up the pairing considerably. In fact, the number of receivers to be paired reduces during each scan of the possible order numbers. Under these conditions, the overall pairing is much faster still.

With the method described in FIG. 2, the probability that the random choice made by a receiver is not also the one made by another receiver is given by $((M-1)/M)^{(P-1)}$.

For P=3 and M=5, there are $(4/5)^2$, that is to say 16 chances in 25 (64%) that a receiver is the only one to have chosen a given order number. This value is $(7/8)^4$ (60%) for P=5 and M=8.

The probability increases significantly from one round to the next if that round makes it possible to complete at least one pairing; the term "round" used here means a scan of all of the possible order numbers. For example, for M=10 and P being equal successively to 6, 5, 4 and 3, the probabilities are respectively equal to 59%, 65%, 73% and 80%. This demonstrates the practical feasibility of the proposed pairing, even in the case where the installer is trying to pair a given receiver with the transmitter he is using.

Finally, it is possible to supply an early exit from the pairing mode, for the case in which all of the receivers will have been able to be paired before having reached the number of ranks in the list. This early exit is carried out for example by means of a specific command or a combination of commands from the transmitter. The detection of this command completes the test 42 of FIG. 2.

The method of FIG. 2 makes it possible to pair a receiver and a transmitter simply. It can be used for pairing one receiver from a plurality of receivers. It is perfectly adapted to installations having a limited number of receivers. However, it may exhibit a drawback if the installer is not able to observe the simultaneity of the signals transmitted by two receivers; this can in particular be the case, for an installation with rolling shutters, if the shutters are in different rooms. The method described now makes it possible to ensure pairing even in this case.

The process of this second example differs from the method of FIG. 2 in the step 30 for determining an order number. In this second example, it is assumed that the receivers are capable of communication with each other, so that the choice of the order number is carried out without two receivers being assigned the same order number.

For this purpose, it is assumed that the receivers are capable of communication with each other. This can be ensured by providing each receiver with a transceiver allowing communication between receivers. This communication is established in a network structure, known to those skilled in the art. The structure of the network is of no significance since the receivers can communicate directly or indirectly. Each receiver therefore transmits requests and receives—unless it is the only one—responses from the other receivers. There are several possibilities of self-sequencing of the receivers, provided they can communicate.

For example, for a first mode of execution, during an initialisation phase, the receivers separately acquire a pseudo-random number before transmitting. A receiver transmits only if the delay corresponding to this pseudo-random number has elapsed: it then announces to the other receivers its order number, equal to the preceding one that it has picked up from another receiver and incremented by one. If two transmissions take place simultaneously, the conflict is detected and the offenders give up their turn in order then to start again with other random acquisitions.

For a second mode of execution, during the initialisation phase, the receivers do not acquire at random the number that times their intervention on the "network", but use their own serial number, each receiver being numbered when manufactured, in order to calculate this delay. This procedure lengthens the initialisation phase but avoids having to implement collision management.

More generally, any technique can be used to ensure the sequencing of the receivers.

This time, by adapting the first or second technique within the scope of the invention, a sequencing of the receivers by consecutive integers from 1 to P, where P is the number of receivers, is therefore obtained.

The programming sequence becomes very simple for the installer:

at the time of each successive pressing of the remote control key of the transmitter that he is holding in his hands (for example the "lower" key), it is one or other of the unassigned receivers of the installation that responds, this time one at a time, and without "blanks" (non-operative pressings).

In practice, the installer will simply be able to remain in position and press at most P times in order for the receiver in front of him to react.

The description given with reference to FIG. 2 is one example of a method for scanning all of the receivers in a one-dimensional scan: the receivers are assigned an order number, which allows a sequencing of the transmitters. It is also possible to use other methods for scanning all of the receivers, supplying signals to the user and allowing him to indicate if the receiver to be paired has or has not supplied the signal.

In this way it is possible to represent all of the receivers by the leaves of a tree. The choice of a receiver is then made by travelling though the tree until reaching the leaf which corresponds to the receiver to be paired. It is possible to use any algorithm for travelling though the tree, insofar as the transmitter can supply a message for each response expected in the algorithm. The advantage of such a representation is being able to use an algorithm with $\log_2(n)$ complexity, where n is the number of receivers.

In general, it is possible to represent all of the receiver by a graph, i.e. by a set of vertices connected by lines. The choice of a receiver is a matter of scanning the graph, using a scanning algorithm. This algorithm can be any algorithm insofar as the expected responses can be supplied by the transmitter.

Even more generally, it is possible to use any algorithm for scanning all of the receivers, always provided that the interrogations are addressed to the user by the signals from the receivers and the responses are supplied by the transmitter.

In the example shown in FIG. 2, the graph is purely linear, and the algorithm for travelling through the graph consists in scanning the linear graph. Other embodiments are described in detail below.

The creation of the graph or of the tree may or may not be automatic, based on an innate or inherited property of the environment. The graph can be dynamic or static.

The creation of the graph can be automatic. For example, when they are switched on, the receivers are sequenced according to the principle that the first one that transmits is the first in the list. In this way a list of receivers is obtained which can be represented by the leaves of a tree. The creation of the graph can also not be automatic: each receiver is for example supplied with a switch which makes it possible for it to be numbered and to assign it with an order number in the network, before that receiver is installed and therefore becomes generally inaccessible or not very accessible to the installer at the time he wants to proceed with subsequent pairing operations. In such a case, the installer, before fitting the receivers, would be able to adjust the switch of each receiver. It is not therefore even necessary for the receivers to be connected to the mains or powered, if the switch is a manual one. Subsequently, the switch is only used to facilitate the sequencing of the receivers or, more generally, for the creation of the graph. This solution simplifies the creation of the graph; as the pairing is then carried out, but not on the basis of the switch, a very high dependability is maintained. It is not longer necessary to supply a complex switch or one having a wide range of adjustment: it typically suffices for the switch to have a number of positions sufficient for an average installation; for example it is possible to simply provide two ten-position wheels for one hundred receivers.

The creation of the graph can result from an innate or acquired property, in the case where properties of the receiver are used for the sequencing. In the example shown in FIG. 2, as described above, it is possible to calculate an order number from the specific number of the receiver in order to reduce collisions. This solution depends on the use of an innate or intrinsic property of the receiver. It would also be possible to use an inherited property of the environment: for example, for a light sensor, the measured illumination value can be used for the sequencing of the receivers.

The graph can be dynamic or static. An example of a dynamic graph consists in providing for each pairing operation the removal of the receiver of commands that has just been paired from the graph. In an example of a static graph, the graph is not modified when a receiver is paired. In the example of FIG. 2, this second solution would result in scanning the list of receivers until the first receiver is paired; for the pairing of a second receiver, the list of receiver is scanned again, including the receiver that has just been paired. This second solution is simpler, insofar as it is not necessary to modify the graph. However, a dynamic graph reduces the duration of pairing, particularly for the last receivers of the set.

Another example of a dynamic graph consists in supplying a new graph each time a key is pressed. An example of such a heuristic system is now given, in the example of rolling shutter receivers. At the time of a first pressing of "Stop", each motor decides to raise or to lower. The installer is positioned in front of one of the rolling shutters. Using the Raise or Lower key, he indicates the direction in which he sees his shutter moving. All of the products that were going in the opposite direction stop. All of those that were going in the right direction start randomly in one direction or the other. The process continues until the shutter is the only one to move. Pairing then becomes possible.

FIG. 3 shows a flowchart of one embodiment of the invention. In Step 60, a subset from among all of the receivers is defined; as mentioned above, it is possible to simply consider half of the receivers, chosen in a deterministic or random manner.

In Step 62, the receivers of the subset supply the signal for the attention of the installer.

In Step 64, depending on the presence of the receiver to be paired among the receivers having supplied the signal, the installer transmits a command, using the transmitter. He can thus abstain from supplying a command during a given time; from this point of view, the absence of command can be considered as a command.

If the receiver to be paired is the only one to have supplied the signal, the process moves to Step 66. In this step, the receiver is paired and the pairing is complete. It is of course possible, if necessary, to continue the process for the pairing of another receiver. The move from Step 64 to Step 66 can be carried out on reception of a pairing command sent by the transmitter. The pairing command may not differ from the command used in the preceding steps but can be interpreted as a pairing command. This can for example be the case when the subset comprises no more than one receiver, in a scanning algorithm where the cardinality of the subset decreases at each iteration.

Otherwise, the process moves from Step 64 to Step 68. In Step 68 a new subset is defined. This subset can be defined as a function of the response transmitted by the transmitter. The process then returns to Step 62, with the new subset.

An example of this method is a dichotomic traversal of a binary tree whose leaves are the receivers. At the first iteration, the subset comprises half of the receivers. At a given iteration, the installer uses the transmitter to send a command, for example a "raise" command, if the receiver to be paired has transmitted the signal; if not, the installer sends a "lower" command. The next subset is thus formed from the preceding half subset in the case of a "raise" command, and from the complementary half subset in the case of a "lower" command. On reaching a leaf in the tree, a pairing command is transmitted, for example a pressing of the "raise" and "lower" keys; alternatively the process can detect, by the number of iterations, that the leaf has been reached, such that the pressing of the "raise" or "lower" key, as before, causes the pairing.

In this example, the step of definition of a new subset comprises the definition of a new subset of cardinality less than the preceding one. This is not essential, as shown in the example of FIG. 2.

In this example of dichotomic progress, the step of definition of a new subset comprises:

the definition of a new subset included in the preceding subset if the receiver to be paired has supplied the signal, and the definition of a new subset disjoint from the preceding subset if the receiver to be paired has not supplied the signal.

The tree or graph is scanned in this way. This constraint in the definition of a new subset also applies to other scanning algorithms. From the hardware point of view, FIG. 4 is a block diagram of an operating unit 44 in which the receiver is integrated. The operating unit's drive part 46 and the receiver 48 which controls the drive part are represented. The receiver 48 has a circuit 50 for receiving and decoding commands and a logic processing unit 52 with an associated memory 54. This logic processing unit is for example a microprocessor; the memory contains a program capable of being executed in the microprocessor and which executes the steps mentioned above. In the example, the signal is supplied by the operating unit by operating the drive part in one way or another. The memory also serves for storing the number of the transmitter. If the receiver can communicate with other receivers, the circuit 50 is also capable of transmitting to other receivers.

The invention is not of course limited to the embodiments given above. Thus, the amount of numbers in the list can differ from the amount given by way of example. It is possible to use any form or any order in the list since the list defines an order in which the receivers or operating units must transmit a signal. The "first" receiver to transmit a signal could thus be the one having the highest number in the list. It will be noted that the scanning of the order numbers can vary, in the direction of increasing or decreasing numbers.

In the examples described above, the transmitters and the receivers use a unique frequency; the transmitters are identified by a unique number, transmitted with the transmitted commands. The method apples equally well in the case where the transmitters each transmit on a separate frequency, or where frequency hopping is used, or different modulations. In fact, the method applies since the transmitter is capable of being identified by the receivers—independently of the way in which this identification is achieved.

The words "receivers" and "operating units" have been used, which apply in particular to the example of rolling shutter operating units. The receiver and the operating unit can be separate elements or can form a single assembly.

In the examples, all of the receivers are assigned a rank. It would also be possible to proceed in a different manner by separating the receivers into sub-groups and by processing only one group at a time. This makes it possible, even in the case of installations with many receivers, to use the method of FIG. 2. However, within each sub-group, this is the equivalent of applying the method: each receiver of the sub-group receives a rank. In the examples, the rank is an absolute rank, represented by a number in a list. It is possible to use other forms of representing the rank, and other methods of sequencing. For example, in the case of receivers able to communicate, it is possible to imagine that the sequencing is carried out progressively as the signals are transmitted. Each receiver not having yet supplied a signal for the attention of the installer would be able to transmit a command to the other receivers after a short and random period to indicate that it is going to transmit a signal to the installer: in this case, the first receiver transmits the signal to the installer and the other receivers wait for the next rank.

Specific embodiments of a transmitter and receiver pairing method according to the present invention have been described for the purpose of illustrating the manner in which the invention may be made and used. It should be understood that implementation of other variations and modifications of the invention and its various aspects will be apparent to those skilled in the art, and that the invention is not limited by the specific embodiments described. It is therefore contemplated to cover by the present invention any and all modifications, variations, or equivalents that fall within the true spirit and scope of the basic underlying principles disclosed and claimed herein.

What is claimed is:

1. A method for pairing a transmitter and one given receiver out of at least two unpaired receivers, the transmitter being adapted for sending an identification message and an actionable command and a pairing command, each receiver being adapted to receive this identification message and actionable command and pairing command and to identify the transmitter and to supply a signal for the attention of a user, the method comprising:
    (a) automatically defining a subset from among the set of unpaired receivers; then
    (b) supplying the signal for the attention of the user by each receiver of the subset; and then
    (c) if only the one given receiver to be paired has supplied the signal for the attention of the user, transmitting the pairing command by the transmitter and pairing the receiver having supplied the signal for the attention of the user with the transmitter which transmitted the pairing command, thus completing the pairing of said one given receiver, and
    (c') if more than one receiver to be paired has supplied the signal for the attention of the user or if the receiver to be paired has not supplied the signal for the attention of the user, automatically defining a new subset and repeating steps (b) and (c).

2. The method of claim 1, wherein the step of defining the new subset comprises defining a new subset of cardinality less than the preceding one.

3. The method of claim 2, wherein the step of defining a new subset comprises
    defining a new subset included in the preceding subset if the receiver to be paired has supplied the signal and
    defining a new subset disjoint from the preceding subset if the receiver to be paired has not supplied the signal.

4. The method of claim 2, wherein the receivers are represented by leaves of a tree.

5. The method of claim 4, wherein the steps (a), (b) and (c) are carried out according to a dichotomic traversal of the tree.

6. The method of claim 1, wherein the step of defining the new subset comprises
    defining a new subset included in the preceding subset if the receiver to be paired has supplied the signal and
    defining a new subset disjoint from the preceding subset if the receiver to be paired has not supplied the signal.

7. The method of claim 1, wherein the receivers are represented by leaves of a tree.

8. The method of claim 7, wherein the steps (a), (b) and (c) are carried out according to a dichotomic traversal of the tree.

9. The method of claim 1, further including assigning each receiver with a rank; wherein defining a subset comprises the choice of a receiver of a given rank, and wherein defining a new subset comprises the choice of a receiver of another rank.

10. The method of claim 9, wherein the assigning step comprises, for each receiver, the choice of an order number independently of the other receivers.

11. The method of claim 9, wherein the choice is random.

12. The method of claim 9, wherein the receivers can communicate, and wherein the assigning step comprises the assigning of a separate number to each receiver.

13. The method of claim 12, wherein the separate numbers are consecutive.

14. The method of claim 9, wherein the step of defining a new subset includes changing of rank and comprises the transmission by the transmitter of a change of rank command.

15. The method of claim 9, wherein the transmitter comprises a unique identification number sent in a command, and wherein the pairing step comprises the storage by the receiver of the number contained in the command.

16. The method of claim 1, wherein the signal for the attention of the user is at least one of a sound signal, a light signal, or a movement signal driven by an operating unit associated with the receiver.

17. A method of pairing for a receiver out of at least two unpaired receivers adapted to receive an identification message and an actionable command and a pairing command sent by a transmitter and to identify the transmitter and to supply a signal for the attention of a user, the method comprising:
    (a) automatically assigning a rank to each receiver; then
    (b) activating a rank; then
    (c) supplying the signal for the attention of the user as a function of this active rank and then
    (d) determining that only one receiver to be paired supplied the signal and on receipt of the pairing command following the supplying step, pairing the transmitter which sent the pairing command.

18. The method of claim 17, wherein the assigning step comprises the choice of an order number.

19. The method of claim 18, wherein the choice is random.

20. The method of claim 17, wherein the receiver can communicate with other receivers, and wherein the assigning step comprises communicating to other receivers and the possible receiving of responses from the other transmitters.

21. The method of claim 17, wherein the step of supplying the signal comprises receiving of at least one change of rank command and the supplying of the signal as a function of the number of change of rank commands received.

22. The method of claim 17, wherein the command sent by a transmitter comprises a unique identification number and wherein the pairing step comprises the storage of the number contained in the command.

23. The method of claim 17, wherein the signal for the attention of the user is at least one of a sound signal, a light signal, or a movement signal driven by an operating unit associated with the receiver.

24. A receiver having:
   a circuit for receiving and for decoding commands sent by a transmitter;
   means for supplying a signal for the attention of a user;
   a program executing a method of pairing for a receiver adapted to receive an identification message and an actionable command and a pairing command sent by a transmitter and for the receiver to identify the transmitter and for the receiver to supply a signal for the attention of a user, the method comprising the steps of:
   (a) automatically assigning a rank; then
   (b) the receiver supplying the signal for the attention of the user as a function of this rank; and then
   (c) on receipt of the pairing command following the supplying step, pairing with the transmitter which sent the pairing command; and
   (c') on no receipt of the pairing command following the supplying step, automatically assigning a new rank and repeating steps (b) and (c); or
   the method comprising the steps of:
   (A) automatically assigning a rank; then
   (B) activating a rank; then
   (C) supplying the signal for the attention of the user as a function of this rank; and then
   (D) on receipt of the pairing command following the supplying step, pairing the transmitter which sent the pairing command.

25. The receiver of claim 24, wherein the receiver comprises a storage memory.

26. The receiver of claim 24, wherein the circuit is also adapted for transmitting.

27. The receiver of claim 24, wherein the signal for the attention of the user is at least one of a sound signal, a light signal, or a movement signal driven by an operating unit associated with the receiver.

* * * * *